(12) United States Patent
Ribo et al.

(10) Patent No.: US 10,097,341 B1
(45) Date of Patent: Oct. 9, 2018

(54) TESTING OF CLOCK AND DATA RECOVERY CIRCUITS

(71) Applicant: Keyssa Systems, Inc., Campbell, CA (US)

(72) Inventors: Jerome Jean Ribo, San Jose, CA (US); Bruno Tourette, Cupertino, CA (US); Roger Isaac, San Jose, CA (US)

(73) Assignee: Keyssa Systems, Inc., Campbell, CA (US)

( * ) Notice: Subject to any disclaimer, the term of this patent is extended or adjusted under 35 U.S.C. 154(b) by 0 days.

(21) Appl. No.: 15/691,675

(22) Filed: Aug. 30, 2017

(51) Int. Cl.
*H04L 7/033* (2006.01)

(52) U.S. Cl.
CPC .................................. *H04L 7/033* (2013.01)

(58) Field of Classification Search
CPC ......... H04L 7/033; H04L 1/243; H04L 25/20; H04L 1/241; H04L 1/244; H04L 43/50
USPC .................. 375/224, 355–359, 368–373, 376
See application file for complete search history.

(56) References Cited

U.S. PATENT DOCUMENTS

| | | | | |
|---|---|---|---|---|
| 8,743,715 | B1 * | 6/2014 | Eddy .................... | H04L 43/50 370/252 |
| 9,088,399 | B1 * | 7/2015 | Poon ...................... | H04L 1/243 |
| 2004/0136411 | A1 * | 7/2004 | Hornbuckle ........... | H04J 3/047 370/537 |
| 2004/0243899 | A1 * | 12/2004 | Bonneau ............. | G01R 31/31709 714/733 |
| 2005/0047495 | A1 * | 3/2005 | Yoshioka ............ | G01R 31/31716 375/219 |
| 2005/0185748 | A1 * | 8/2005 | Wahi ....................... | H03L 7/089 375/376 |
| 2007/0022334 | A1 * | 1/2007 | Kim ....................... | G11C 29/56 714/718 |
| 2008/0143396 | A1 * | 6/2008 | Nishida ............ | G01R 31/31709 327/146 |
| 2008/0172195 | A1 * | 7/2008 | Nakadaira ........ | G01R 31/31709 702/72 |
| 2010/0102890 | A1 * | 4/2010 | Stratz ............... | G01R 31/31727 331/44 |
| 2011/0001531 | A1 * | 1/2011 | Nishi ................... | H03L 7/0807 327/162 |

(Continued)

OTHER PUBLICATIONS

Allen, P.E., "Lecture 200—Clock and Data Recovery Circuits," 2003, 16 pages [Online] [Retrieved on Jan. 23, 2018] Retrieved from the Internet<URL:http://pallen.ece.gatech.edu/Academic/ECE_6440/Summer_2003/L200-CDR-I(2UP).pdf.

*Primary Examiner* — Emmanuel Bayard
(74) *Attorney, Agent, or Firm* — Fenwick & West LLP

(57) ABSTRACT

A device comprises a clock data recovery (CDR) circuit. The CDR circuit has an input node to receive an input data signal, an output node, a data recovery circuit, and a self-test circuit. The CDR circuit supports a first mode of operation and a second mode of operation. In the first mode, the CDR circuit receives the input data signal at the input node and provides the input data signal to an input of the data recovery circuit, the data recovery circuit recovers first data from the input data signal, and the CDR circuit provides the first data for output at the output node. In the second mode, the self-test circuit generates a test data pattern which is provided to the output node and looped back to the input of the data recovery circuit, the data recovery circuit recovers second data from the test data pattern, and the self-test circuit checks the second data for errors.

20 Claims, 9 Drawing Sheets

(56) References Cited

U.S. PATENT DOCUMENTS

| | | | |
|---|---|---|---|
| 2011/0199138 A1* | 8/2011 | Sano | H03L 7/07 |
| | | | 327/158 |
| 2013/0141145 A1* | 6/2013 | Yu | H03L 7/0807 |
| | | | 327/157 |
| 2013/0151185 A1* | 6/2013 | Yagoshi | G01R 31/31709 |
| | | | 702/64 |
| 2013/0316653 A1 | 11/2013 | Kyles et al. | |
| 2013/0329843 A1* | 12/2013 | Takeuchi | H04L 7/0331 |
| | | | 375/375 |
| 2014/0046616 A1* | 2/2014 | Cheng | G01R 31/31712 |
| | | | 702/120 |
| 2014/0219406 A1* | 8/2014 | Chen | H03L 7/085 |
| | | | 375/362 |
| 2015/0168486 A1 | 6/2015 | Isaac et al. | |
| 2015/0293173 A1* | 10/2015 | Tsuboi | G01R 31/3177 |
| | | | 714/727 |
| 2017/0019247 A1* | 1/2017 | Iyer | H04L 7/027 |
| 2017/0153689 A1* | 6/2017 | Baumgartner | G06F 1/3253 |

\* cited by examiner

TESTING OF CLOCK AND DATA RECOVERY CIRCUITS

BACKGROUND

Modern high speed communication channels can be used for transmission of data using a variety of protocols and with multiple data rates. To support communications over these channels, clock and data recovery (CDR) circuits can be used to recover both clock and data from a data signal transmitted over a communication channel. The complexity of these CDR circuits continues to increase, which also increases the difficulty in testing and verifying the proper operation of these CDR circuits.

SUMMARY

In one embodiment, a device comprises a clock data recovery (CDR) circuit having an input node, an output node, a data recovery circuit, and a self-test circuit. The CDR circuit supports a first mode of operation and a second mode of operation. In the first mode, the CDR circuit receives the input data signal at the input node and provides the input data signal to an input of the data recovery circuit, the data recovery circuit recovers first data from the input data signal, and the CDR circuit provides the first data to the output node. In the second mode, the self-test circuit generates a test data pattern which is provided to the output node and looped back to the input of the data recovery circuit, the data recovery circuit recovers second data from the test data pattern, and the self-test circuit checks the second data for errors.

In one embodiment, the first mode is a normal mode of operation and the second mode is a built in self-test (BIST) mode of operation In one embodiment, the self-test circuit generates a test result signal indicating whether a built in self-test (BIST) has passed or failed based on whether errors are detected in the second data.

In one embodiment, the self-test circuit comprises a test pattern generator circuit operative to generate the test data pattern and a test pattern checker circuit operative to check the second data for errors. In one embodiment, the test pattern generator circuit operates according to a first clock signal and the test pattern checker circuit operates according to a second clock signal different than the first clock signal. In one embodiment, the CDR circuit comprises a first in first out (FIFO) buffer circuit having an input side that operates according to the second clock signal and an output side that operates according to the first clock signal.

In one embodiment, the device comprises a multiplexer. The multiplexer has a first multiplexer input coupled to an output of the FIFO, a second multiplexer input coupled to an output of the test pattern generator circuit, and a multiplexer output, the multiplexer selecting the first multiplexer input in the first mode and selecting the second multiplexer input in the second mode.

In one embodiment, the test data pattern is a pseudo-random data pattern. In one embodiment, the self-test circuit includes a pseudo-random binary sequence (PRBS) checker circuit that checks the second data for errors.

In one embodiment, the CDR circuit comprises a clock recovery circuit. In the first mode, the clock recovery circuit recovers a clock signal from the input data signal. In the second mode, the clock recovery circuit recovers the clock signal from a reference clock signal instead of the input data signal.

In one embodiment, the clock recovery circuit comprises a phase locked loop circuit. In the first mode, the phase locked loop circuit performs a phase comparison of the clock signal to the input data signal, and recovers the clock signal based on the phase comparison of the clock signal to the input data signal. In the second mode, the phase locked loop circuit divides a frequency of the clock signal to generate a frequency divided clock signal, performs a phase comparison of the reference clock signal to the frequency divided clock signal, and recovers the clock signal based on the phase comparison of the reference clock signal to the frequency divided clock signal.

In one embodiment, the device comprises a multiplexer having a first multiplexer input coupled to the input node, a second multiplexer input coupled to the output node via the loopback signal path, and a multiplexer output coupled to an input of the data recovery circuit, the multiplexer selecting the first multiplexer input in the first mode and selecting the second multiplexer input in the second mode.

In one embodiment, the device comprises a transducer to convert between an extremely high frequency (EHF) electrical signal and an EHF electromagnetic signal. The device also comprises at least one of (a) a transmitter circuit to modulate a carrier signal with the recovered first data from the CDR circuit to generate the EHF electrical signal; or (b) a receiver circuit to demodulate the EHF electrical signal into the input data signal for the CDR circuit.

In one embodiment, a method of performing a system level test in a system that comprises a first clock and data recovery (CDR) circuit of a first communication device and a second CDR circuit of a second communication device is disclosed. The method comprises generating a test data pattern by the first CDR circuit; transmitting the test data pattern from the first communication device to the second communication device; recovering, by the second CDR circuit, data from the test data pattern; checking, by a test circuit of the second CDR circuit, the recovered data for errors; and generating a test result signal indicating whether the system level test has passed or failed based on whether errors are detected in the recovered data.

In one embodiment, the method comprises varying one or more parameters of the first CDR circuit to introduce jitter into the test data pattern. A data eye scanning operation is performed by: adjusting a phase of a clock signal within the second CDR circuit that is used to recover the data from the test pattern; and monitoring the test result signal for one or more phases of the clock signal.

In one embodiment, the one or more parameters are varied under control of test equipment that is external to the first communication device and the second communication device, and the phase of the clock signal is adjusted under control of the test equipment.

In one embodiment, the test data pattern is a pseudorandom data pattern and the test circuit is a pseudorandom binary sequence (PRBS) checker circuit. In one embodiment, the second CDR circuit includes a first in first out (FIFO) buffer circuit having an input side that operates according to the second clock signal and an output side that operates according to the first clock signal, wherein the PRBS checker circuit operates according to the second clock signal.

In one embodiment, the first communication device is a first EHF communication device, the second communication device is a second EHF communication device, and transmitting the test data pattern from the first communication device to the second communication device comprises transmitting the test data pattern from the first EHF communication device to the second EHF communication device via an EHF electromagnetic communication channel.

BRIEF DESCRIPTION OF THE DRAWINGS

The teachings of the embodiments herein can be readily understood by considering the following detailed description in conjunction with the accompanying drawings.

Figure (FIG.) 1 is a communication system, according to an embodiment of the disclosure.

DETAILED DESCRIPTION OF EMBODIMENTS

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

Figure 1:
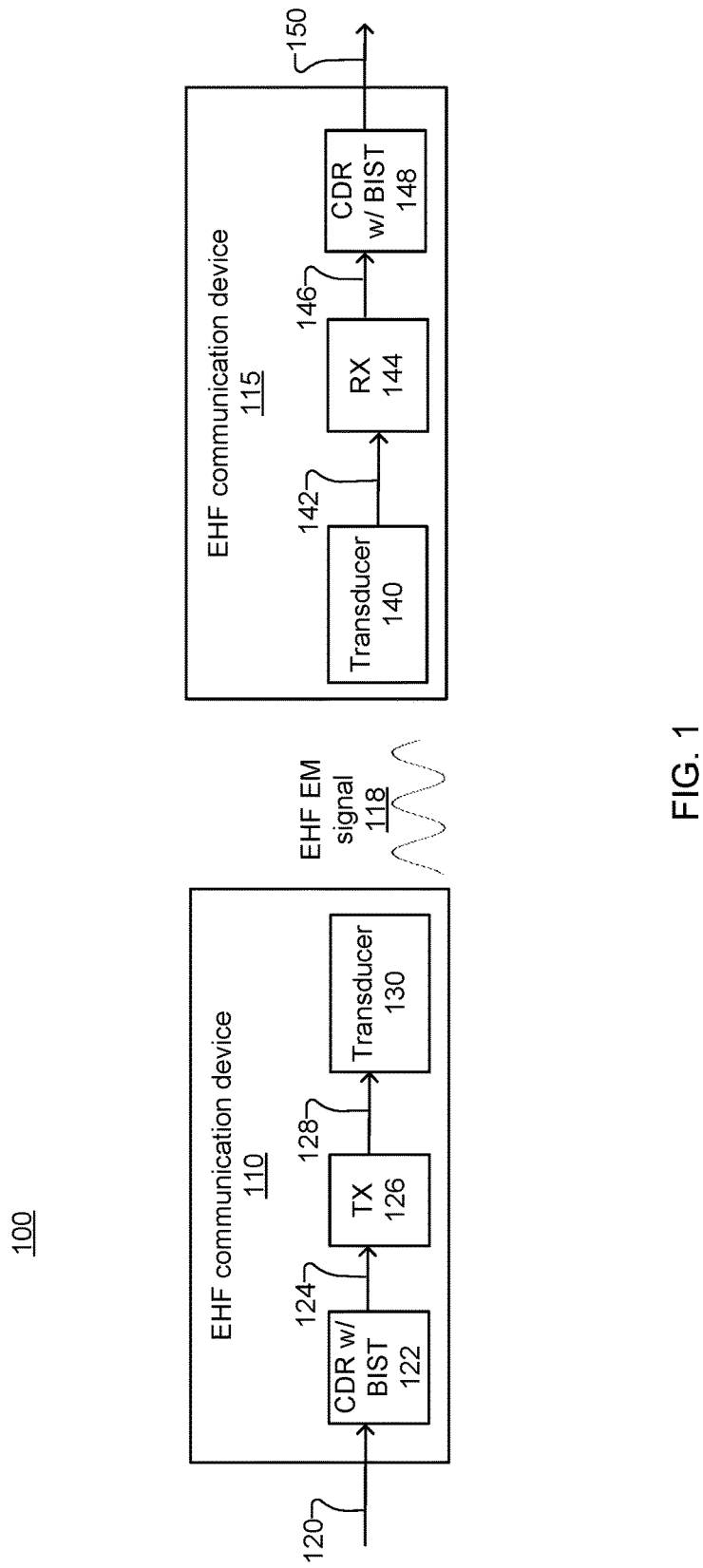

FIG. 1 is a communication system 100, according to an embodiment of the disclosure. The communication system 100 includes an extremely high frequency (EHF) communication device 110 that communicates wirelessly with EHF communication device 115 over an EHF communication channel. The EHF communication channel can be, for example, a dielectric waveguide or air. EHF refers to a frequency range that is between 30 GHz and 300 GHz. In other embodiments, the two devices 110 and 115 may communicate with each other using a frequency range other than EHF, or through a wired communication channel.

EHF communication device 110 includes a clock and data recovery (CDR) circuit 122 with built in self-test (BIST) capabilities, a transmitter circuit 126, and a transducer 130. The CDR circuit 122 receives a data signal 120 over a wired communication channel. The CDR circuit 122 recovers a clock signal from the data signal 120, recovers data from the data signal 120, retimes the recovered data, and generates a data signal 124 that includes the retimed recovered data. The transmitter 126 modulates an EHF carrier signal using the data signal 124 to generate an EHF electrical signal 128. The transducer 130 converts the EHF electrical signal 128 into the EHF electromagnetic signal 118 (e.g. EHF radiation) which is transmitted to the other EHF communication device 115.

EHF communication device 115 includes a transducer 140, a receiver circuit 144, and a CDR circuit 148 with BIST capabilities. The transducer 140 receives the EHF electromagnetic signal 118 via an EHF electromagnetic communication channel and converts the EHF electromagnetic signal 118 into an EHF electrical signal 142. The receiver circuit 144 demodulates the EHF electrical signal 142 into a data signal 146. The CDR circuit 148 recovers a clock signal from the data signal 142, recovers data from the data signal 142, retimes the recovered data, and generates a retimed data signal 150 that includes the retimed recovered data. The retimed data signal 150 is transmitted across a wired communication channel.

In one embodiment, EHF communication devices 110 and 115 are separate IC packages. CDR circuit 122 and transmitter 126 are located on an IC die, and the transducer 130 is separate from the IC die. Similarly, receiver 144 and CDR circuit 148 are located on an IC die, and the transducer 140 is separate from the IC die. In some embodiments, each EHF communication device 110 and 115 may be a transceiver such that a single EHF communication device includes both a transmitter and a receiver.

The CDR circuits 122 and 148 include BIST capabilities, which allow the operation of the CDR circuits 122 and 148 to be tested and verified before they are shipped to customers. The details of the CDR circuits 122 and 148 and their BIST capabilities are further described by reference to FIGS. 2 to 5.

Built in Self Test

Figure 2:
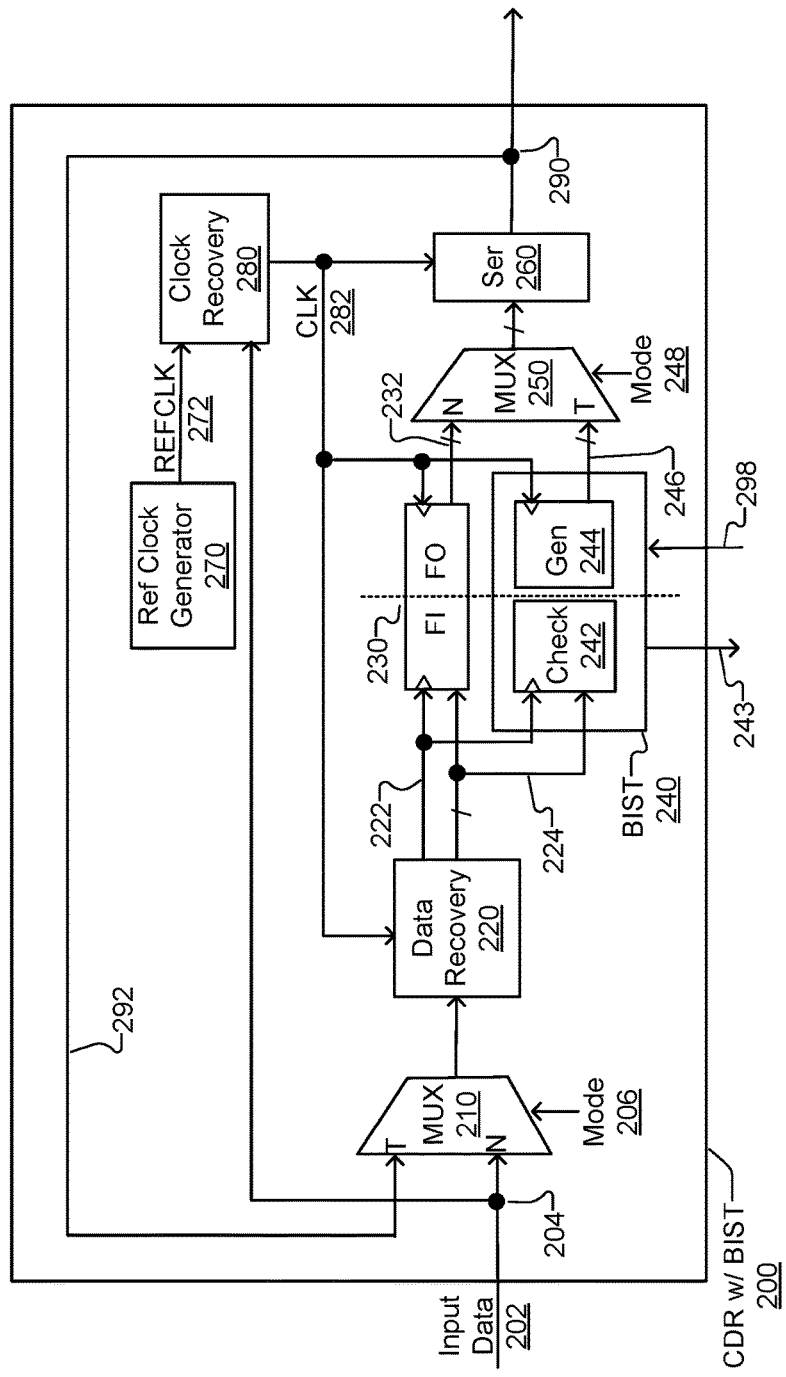
FIG. 2 is a CDR circuit with built in self-test capabilities from FIG. 1, according to an embodiment of the disclosure.

FIG. 2 is a CDR circuit 200 with built in self-test capabilities from FIG. 1, according to an embodiment of the disclosure. The CDR circuit 200 may represent either CDR circuit 122 or 148 from FIG. 1. As shown, the CDR circuit 200 includes an input node 204, input multiplexer (MUX) circuit 210, a data recovery circuit 220, a FIFO circuit 230, a BIST control circuit 240, an output MUX circuit 250, a serializer circuit 260, a reference clock generator circuit 270, a clock recovery circuit 280, an output node 290 and loopback signal path 292. The BIST control circuit 240 further includes a test pattern checker circuit 242 and a test pattern generator circuit 244.

The CDR circuit 200 supports both a normal mode of operation and a BIST mode of operation. The normal mode of operation will first be explained. The BIST mode of operation will then be explained after the normal mode of operation is explained. Whether the CDR circuit 200 operates in the normal mode of operation or the BIST mode of operation can be controlled by the state of a test mode control signal 298. If the test mode control signal 298 is a logic 0, the CDR circuit 200 may operate in the normal mode, and if the test mode control signal 298 is a logic 1, the CDR circuit 200 may operate in the BIST mode.

During the normal mode, the input node 204 receives the input data signal 202. The input data signal 202 can represent real data from a remote device and be encoded in a non-return-to-zero (NRZ) format with signal edges at the NRZ transitions. The clock recovery circuit 280 receives the input data signal 202 and recovers a clock signal 282 from the input data signal 202. The recovered clock signal 282 may be phase aligned and locked to the signal edges of the input data signal 202. In one embodiment, the clock recovery circuit 280 is or comprises a phase locked loop (PLL).

The input MUX 210 has a normal mode input N and a test mode input T. The normal mode input is coupled to the input node 204, and the test mode input T is coupled to the loopback signal path 292. The input MUX 210 selects, under control of the mode selection signal 206, one of its two inputs to provide to the input of the data recovery circuit 220. During the normal mode, the normal mode input N is selected by the mode select signal 206, which causes the input data signal 202 to be provided to the data recovery circuit 220.

The data recovery circuit 220 has an input that is coupled to the output of the MUX 210. During normal mode, the data recovery circuit 220 receives the input data signal 202 via the MUX 210, and also receives the recovered clock signal 282. The data recovery circuit 220 generates a phase adjusted clock signal 222 from the recovered clock signal 282, and also uses the phase adjusted clock signal 222 to sample and recover data 224 from the input data signal 202. The recovered data 224 is output from the data recovery circuit 220 in a parallel data format.

The FIFO circuit 230 has an input coupled to the output of the data recovery circuit 220. The FIFO circuit 230 is a circular buffer having an input side that reads in the data 224 at the timing of the phase adjusted clock signal 222. The FIFO circuit 230 has an output side that outputs the recovered data 232 at the timing of the recovered clock signal 282. A FIFO write pointer identifies the location in the circular buffer where data is to be stored, and a FIFO read pointer identifies the location in the circular buffer where data is to be read from. The FIFO 230 operates as a re-timer circuit that retimes the data from the clock domain of the phase adjusted clock signal 222 to the clock domain of the recovered clock signal 282. The FIFO 230 is filled with data according to the phase adjusted clock signal 222 from one clock domain, and it is emptied of data according to recovered clock signal 282 from another clock domain. The separation of clock domains is shown in FIG. 2 by the vertical dashed line. As used herein, being in a clock domain may refer to operation according to the timing of a particular clock signal.

The output MUX 250 has a normal mode input N and a test mode input T. The normal mode input N is coupled to the output of the FIFO 230 and the test mode input T is coupled to the output of the test pattern generator circuit 244. The output MUX 250 selects, under control of the mode selection signal 248, one of the two inputs to provide to the output of the MUX 250. During the normal mode of operation, the normal mode input N is selected by the mode select signal 248, which causes the recovered data 232 to be provided to the output of the MUX 250.

The serializer 260 has an input that is coupled to the output of the MUX 250. During normal mode, the serializer 260 serializes the recovered data 232, which is in parallel format, into serial format. The serialized retimed data is then provided to the output node 290 of the CDR circuit 200.

The BIST mode of operation will now be explained. During the BIST mode, a data input signal 202 may not be available. The clock recovery circuit 280 instead receives a reference clock signal 272 generated by a reference clock generator 270. The reference clock signal 272 may be a low speed clock signal. The clock recovery circuit 280 uses the reference clock signal 272 to generate the recovered clock signal 282. The recovered clock signal 282 may be phase aligned with and locked to the reference clock signal 272. The recovered clock signal 282 may have a higher frequency than the reference clock signal 272.

During the BIST mode, the BIST control circuit 240 is active and the test pattern generator circuit 244 generates and outputs a test data pattern 246. In one embodiment, the test pattern generator circuit 244 is a pseudorandom binary sequence (PRBS) generator which generates a pseudorandom test data pattern 246 that is $2^N-1$ bits long. The PRBS generator may include, for example, a linear feedback shift register (LFSR) that generates the pseudorandom test data pattern starting from a seed value. The test pattern generator circuit 244 is in the same clock domain as the output side of the FIFO 230 and outputs the test data pattern 246 at a timing controlled by the recovered clock signal 282.

The test mode input T of the output MUX 250 is selected by the mode select signal 248, which causes the test data pattern 246 to be provided to the output of the MUX 250. The serializer 260 serializes the test data pattern 246, which is in parallel format, into serial format. The serialized test data pattern is then provided the output node 290, where it is looped back to the test mode input T of the input MUX 210 via the loopback signal path 292. The test mode input T of the input MUX 210 is selected by the mode select signal 206, and so the MUX 210 provides the data at its test mode input T to the data recovery circuit 220.

As a result of the configuration of the MUXes 250 and 210 in BIST mode, the test data pattern 246 is provided to the output node 290 through the MUX 250 and serializer 260, and then looped back to the input of the data recovery circuit 220 via the loopback path 292 and the MUX 210. The data recovery circuit 220 receives the test data pattern 246 at its input, and also receives the recovered clock signal 282. The data recovery circuit 220 generates a phase adjusted clock signal 222 from the recovered clock signal 282, uses the phase adjusted clock signal 222 to sample and recover data 224 from the test data pattern 246. The recovered data 224 is output from the data recovery circuit 220.

The test pattern checker circuit 242 has an input that is coupled to the output of the data recovery circuit 220. The test pattern checker circuit 242 is in the same clock domain as the input side of the FIFO 230 and reads in the recovered data 224 at a timing controlled by the phase adjusted clock signal 222. The test pattern checker circuit 242 checks the recovered data 224 for the presence of errors. In one embodiment, the test pattern checker circuit 242 is a PRBS checker circuit. In the case of a $2^N-1$ bit long pseudo random test data pattern 246, the PRBS checker circuit may capture N bits of data 224 and then deterministically predict the remaining bit sequence of a pseudo random pattern from the first N bits. For example, a $2^7-1=127$ bit long pseudo random pattern will require only 7 consecutive bits to be known before the remaining 120 bits are fully predictable. The remaining bits of the recovered data 224 after the Nth bit are then compared against the deterministically predicted bits to identify errors in the recovered data 224. In other words, the test pattern checker circuit 242 is able to generate the same data sequence as the test pattern generator circuit 244 after accumulating N incoming bits, which is then used to verify that the N+1th and subsequent bits of the recovered data 224 are correct. In one embodiment, a PRBS checker circuit can be implemented with a LFSR that is seeded with the first N bits of the recovered data, and which predicts the remaining bit sequence of the pseudorandom data pattern after it is seeded.

The BIST circuit 242 then outputs a test result signal 243 having a logic state that indicates whether the BIST failed or passed. Whether the BIST fails or passes depends on whether there are any errors in the recovered data 224. The BIST fails if there is a bit error detected in the recovered data 224 by the test pattern checker circuit 242. Even a single bit failure will result in a BIST failure. The BIST passes if there are no errors in the recovered data 224.

The CDR circuit of FIG. 2 thus includes BIST capabilities that are integrated into the CDR circuit 200. During a normal mode of operation, the recovered data 224 is first type of data recovered from the input data signal 202. The FIFO 230 is used to read the recovered data 224 with one clock signal 222 and to output recovered data 232 to the output node 290 using a different clock signal 282. During a BIST mode, the recovered data 224 is a second type of data recovered from the test data pattern 246. The FIFO 230 is not used and the test pattern generator 244 is used to generate the test data pattern 246, and the test pattern checker 242 verifies whether data 224 recovered from the test data pattern 246 includes errors.

Advantageously, the disclosed CDR 200 with BIST capabilities allows for BIST integration into a CDR with very little overhead, while still allowing most of the functions of the CDR to be tested. When compared to a BIST architecture that simply feeds a test pattern into the input node 202 and checks the resulting test pattern at the output node 290, the approach in FIG. 2 can be implemented with less overhead. For example, the test pattern generator circuit 244 can be an 8 bit parallel pseudo random generator that takes up very little die space. Additionally, checking the test pattern data at node 290 would require an additional circuit that resamples high speed serial data and checks the data at a high speed, which is not needed in the approach shown in FIG. 2 since the test pattern checking circuit 242 bypasses the FIFO 230 and serializer 260 and receives recovered data 224 directly from the data recovery circuit 220.

Figure 3:
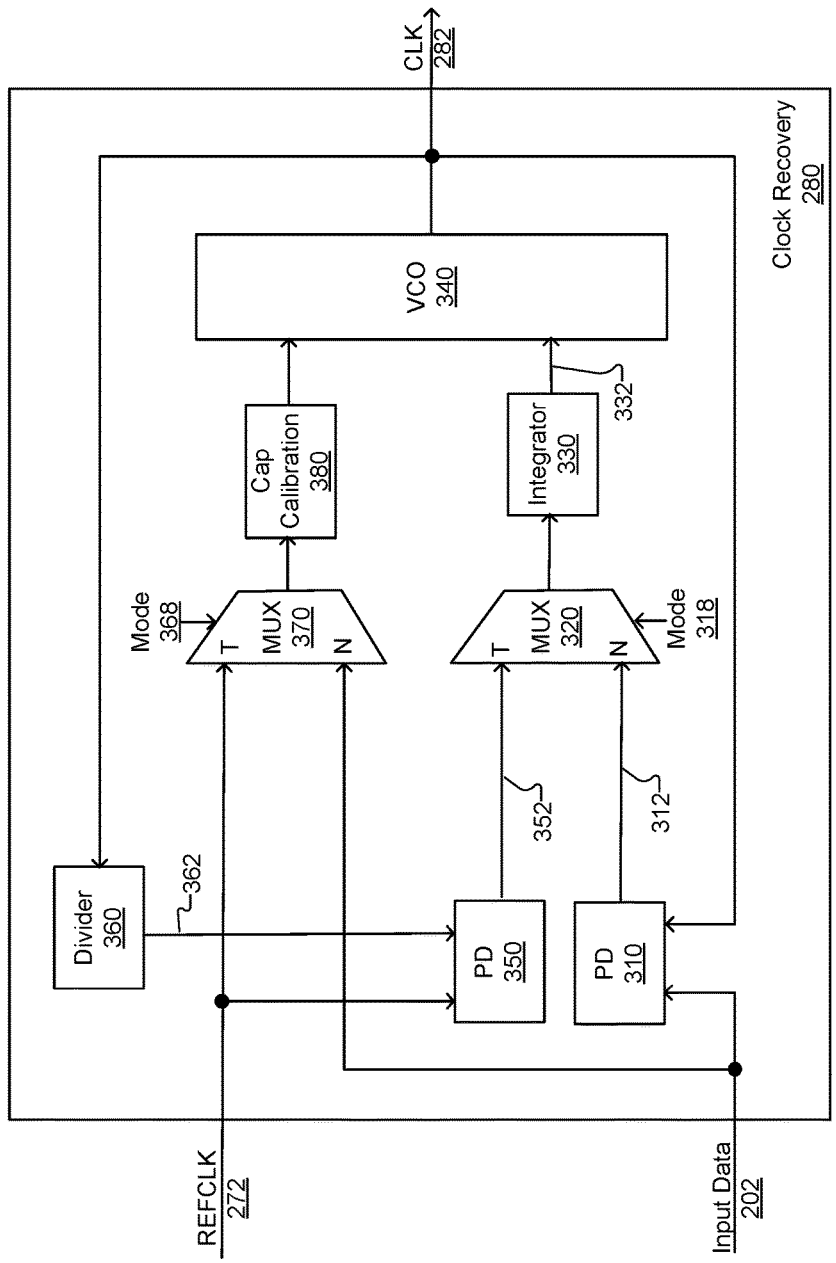
FIG. 3 illustrates the details of a clock recovery circuit from the CDR circuit of FIG. 2, according to an embodiment of the present disclosure.

FIG. 3 illustrates the details of a clock recovery circuit 280 from the CDR circuit 200 of FIG. 2, according to an embodiment of the present disclosure. The clock recovery circuit 280 includes a phase detector circuit 310, a phase detector circuit 350, a MUX circuit 320, an integrator circuit 330, a voltage controlled oscillator (VCO) 340, a MUX circuit 370, a capacitor bank calibration circuit 380, and a frequency divider circuit 360. The phase detector circuits 310 and 350 may be bang-bang phase detectors. The clock recovery circuit 280 operates differently depending on whether the CDR circuit 200 is in the normal mode or the BIST mode.

The operation of the clock recovery circuit 280 in normal mode is first explained. The MUX 370 has a normal mode input N and a test mode input T. The normal mode input N is coupled to receive the input data signal 202, and the test mode input T is coupled to receive the reference clock signal 272. The MUX 370 selects one of the two inputs under control of the mode selection signal 368. During normal mode, the MUX 370 selects the normal mode input N, which causes the input data signal 202 to be provided to the output of the MUX 370.

The capacitor calibration circuit 380 has an input that is coupled to the output of the MUX 370. During normal mode, the capacitor calibration circuit 380 receives the input data signal 202 and calibrates one or more capacitor banks within a LC tank of the VCO 340 using the input data signal 202. Calibrating the capacitor banks can involve selecting between one of several possible capacitor bank configurations for the VCO 340. Each capacitor bank configuration has a different capacitance level and the capacitance level affects the frequency range of the VCO.

Still referring to the normal mode, the phase detector circuit 310 compares the input data signal 202 to the recovered clock signal 282 output by the VCO 340. The phase detector circuit 310 outputs a phase comparison signal 312 that indicates whether the phase of the input data signal 202 is earlier or later than the phase of the recovered clock signal 282.

The MUX 320 has a normal mode input N and a test mode input T. The normal mode input N is coupled to the phase detector 310, and the test mode input T is coupled to the other phase detector 350. The MUX 320 selects one of the two inputs under control of the mode selection signal 318. During normal operating mode, the MUX 320 selects the normal mode input N, which causes the phase comparison signal 312 to be provided to the output of the MUX 320.

The input of the integrator circuit 330 is coupled to the output of the MUX 320. During normal mode, the integrator 330 integrates the phase comparison signal 312 and outputs an integration result signal 332 representative of the integration result to the VCO 340. The VCO 340 generates the recovered clock signal 282. The voltage level of the integration result signal 332 controls the frequency of the recovered clock signal 282 generated by the VCO 340.

The operation of the clock recovery circuit 280 during BIST mode is now explained. The operation of the clock recovery circuit 280 during BIST mode is similar to the operation during the normal mode, except that the mode selection signal 368 now causes MUX 370 to select its test mode input T, and the mode selection signal 318 now causes the MUX 320 to select its test mode input T.

During BIST mode, the MUX 370 selects the test mode input T, which causes the reference clock signal 272 to be provided to the output of the MUX 370. The capacitor calibration circuit 380 receives the reference clock signal 272 and calibrates one or more capacitor banks of the VCO 340 using the reference clock signal 272.

Also during BIST mode, the frequency divider circuit 360 frequency divides the recovered clock signal 282 to generate a frequency divided clock signal 362. For example, the frequency divider circuit 360 may divide the frequency by 10 to generate the frequency divided clock signal 362.

The phase detector 350 compares the reference clock signal 272 to the frequency divided clock signal 362. The phase detector 350 outputs a phase comparison signal 352 that indicates whether the phase of the reference clock signal 272 is earlier or later than the phase of the frequency divided clock signal 362.

The MUX 320 selects the test mode input T, which causes the phase comparison signal 352 to be provided to the output of the MUX 320. The integrator 330 integrates the phase comparison signal 352 and outputs an integration result signal 332 representative of the integration result to the VCO 340. The voltage level of the integration result signal 332 controls the frequency of the clock signal 282 generated by the VCO 340.

During the BIST mode, the clock recovery circuit 280 thus generates a clock signal 282 that is comparable to the clock signal 282 that would be generated during the normal operating mode. The recovered clock signal 282 can be generated even though the input data signal 202 is not available. Additionally, the added overhead to generate the recovered clock signal 282 is fairly small and involves the addition of only a few circuits, such as a frequency divider 360, phase detector 350, and MUXes 320 and 370.

Figure 4:
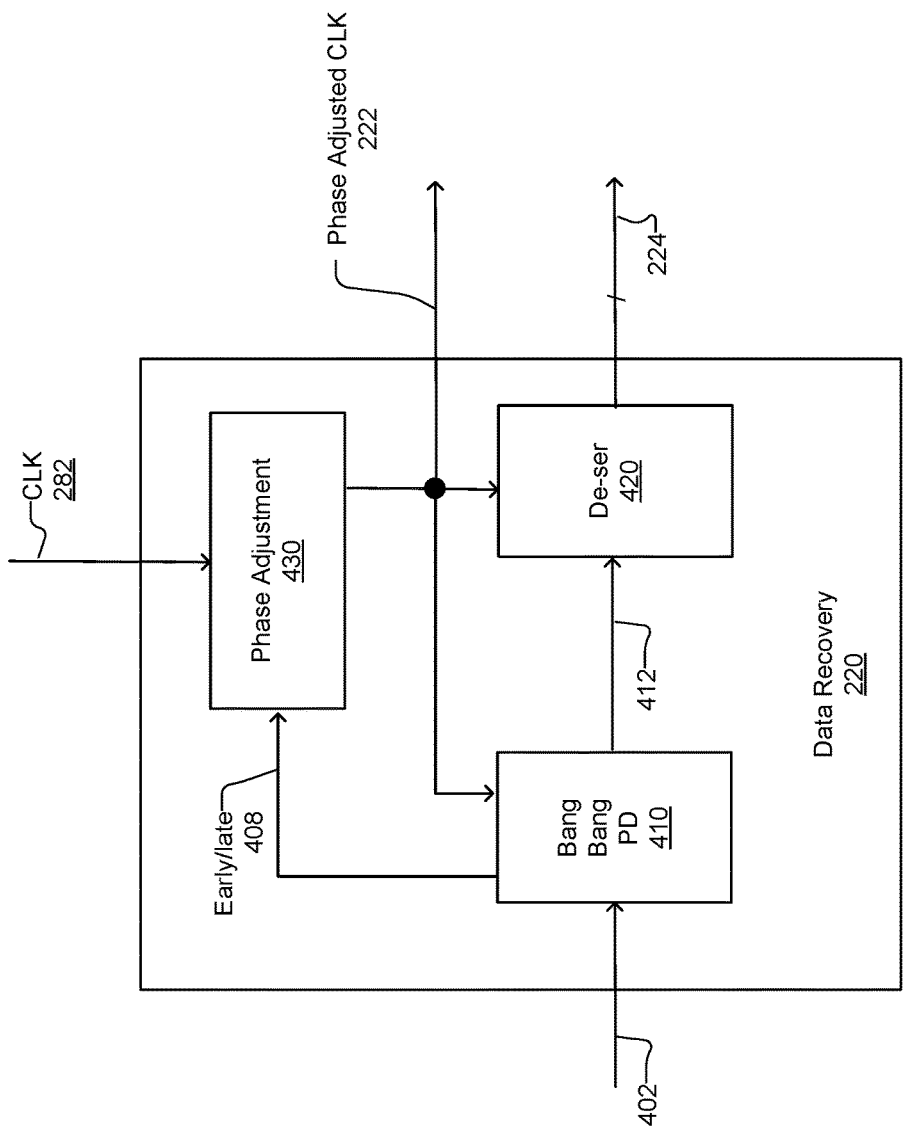
FIG. 4 illustrates the details of a data recovery circuit from the CDR circuit of FIG. 2, according to an embodiment of the present disclosure.

FIG. 4 illustrates the details of a data recovery circuit 220 from the CDR circuit 200 of FIG. 2, according to an embodiment of the present disclosure. The data recovery circuit 220 includes a phase adjustment circuit 430, a bang-bang phase detector 410, and a deserializer circuit 420.

The phase adjustment circuit 430 receives the recovered clock signal 282 and adjusts a phase of the recovered clock signal 282 to generate a phase adjusted clock signal 222. The phase adjusted clock signal 222 typically has a phase that is delayed from the recovered signal 282. The phase adjustment circuit 430 can support a large number of possible phase positions (e.g. from 0-360 degrees). The clock phase is adjusted in response to the early/late signal 408 from the bang-bang phase detector 410. In one embodiment, the phase adjustment circuit 430 is a phase interpolator circuit.

The bang-bang phase detector 410 compares the phase of the phase adjusted clock signal 222 to the phase of signal transitions of the signal at the input to the bang-bang PD 410. The input signal 402 can be the input data signal 202 during the normal mode, or the input signal 402 can include the test data pattern 246 during the BIST mode. The bang-bang phase detector 410 then outputs an early/late signal 408 indicating whether the phase of the input signal 402 is earlier than or later than the phase of the phase adjusted clock signal 222.

The bang-bang phase detector 410 also uses the phase adjusted clock signal 222 to sample the input signal 402, and outputs the resulting samples as recovered data 412 in serialized format. The deserializer circuit 420 deserializes the serialized recovered data 412 into recovered data 224 in a parallel data format (e.g. 8 bit parallel data).

In some embodiments, during BIST mode, there can be a phase testing sub-mode in which the phase position of the phase adjustment circuit 430 is incrementally adjusted in to order to step through all of its supported phase positions. The incremental adjustment of the phase positions is used to confirm that the phase adjustment circuit 430 operates as expected and is not malfunctioning. The early/late signal 408 is typically ignored during these phase testing operations, which opens the loop between the phase adjustment circuit 430 and the bang-bang phase detector 410. In specific, the phase position can move forward or backward until a FiFo overflow is triggered. Such a condition (overflow triggered) can happen if the phase has been shifted by several Unit Intervals. In some embodiments, the same process as the one just described is used for eye scanning during a system level test. The system level test is later described by reference to FIGS. 6A-8.

Figure 5:
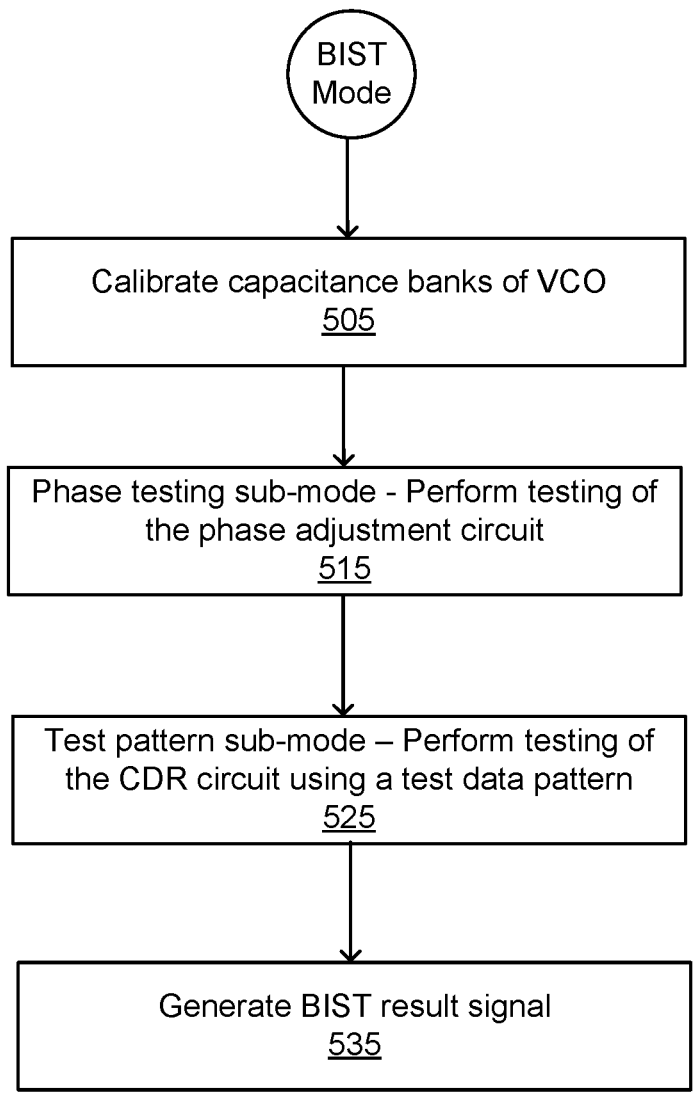
FIG. 5 illustrates a method of operation during a built in self-test mode of operation, according to an embodiment.

FIG. 5 illustrates a method of operation during a built in self-test (BIST) mode of operation, according to an embodiment. The steps of FIG. 5 may be performed while the EHF communication devices 110 or 115 are connected to test equipment in a test facility before the EHF communication devices 110 or 115 are shipped to a customer. In addition, the steps of FIG. 5 may be controlled by a state machine inside of the BIST control circuit 240.

In step 505, one or more capacitance banks of the VCO 340 are first calibrated. The capacitance bank is typically calibrated using an internally generated reference clock 272. However, in some embodiments, an externally generated reference clock is generated by test equipment external to the EHF communication devices 110 or 115 and is used in place of the internally generated reference clock 272 when calibrating the capacitance banks of the VCO 340.

In step 515, once the capacitance banks of the VCO are calibrated, a phase testing sub-mode begins. During the phase testing sub-mode, testing of the phase adjustment circuit 430 is performed. The phase adjustment circuit 430 is tested by cycling through the phase adjustment positions of the phase adjustment circuit 430 until it causes the write and read pointer of the FiFo to cross domains, activating overflow pointers and ending the test of step 515. The presence of an overflow indicates that the phase adjustment circuit 430 is operating properly.

In step 525, once the phase testing sub-mode is completed, a test pattern sub-mode begins. During the test pattern sub-mode, the test pattern generator circuit 244 generates a test data pattern 246 that is looped back to the input of the data recovery circuit 220 via the loopback signal path 292. The data recovery circuit 220 recovers data 224 from the test data pattern 246. The test pattern checker circuit 242 checks the recovered data 224 for errors.

The process in step 525 can repeated one or more times for different data rates. The data rate can be adjusted by increasing or reducing the data rate of the generated test data pattern 246. The frequency of the reference clock signal 272 can also be increased or decreased in order to adjust the frequency of the clock signal 282.

In step 535, a test result signal 243 is then generated based on the result of the phase testing sub-mode and the test pattern sub-mode. The test result signal 243 has a logic state that indicates whether the BIST passed or failed. The BIST may pass if there are no failures during the phase testing sub-mode and the test pattern sub-mode. The BIST may fail if there is at least one failure during one of these two sub-modes. For example, if even a single bit of the recovered data 224 does not match the test data pattern 246, it can trigger a BIST failure.

System Level Test

Figure 6A:
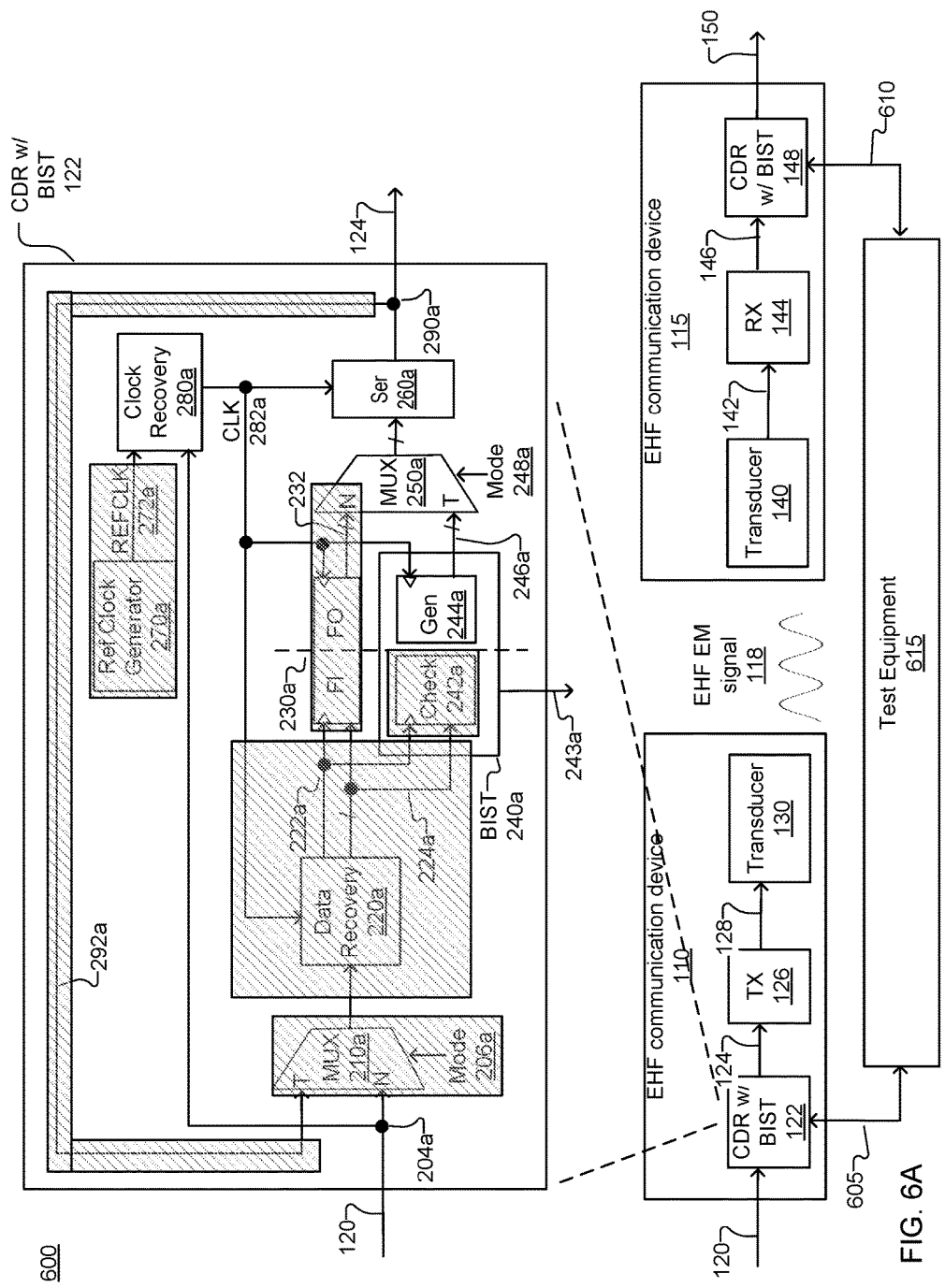
FIGS. 6A and 6B illustrate performing a system level test using the BIST capabilities of clock data recovery circuit, according to another embodiment.
Figure 6B:
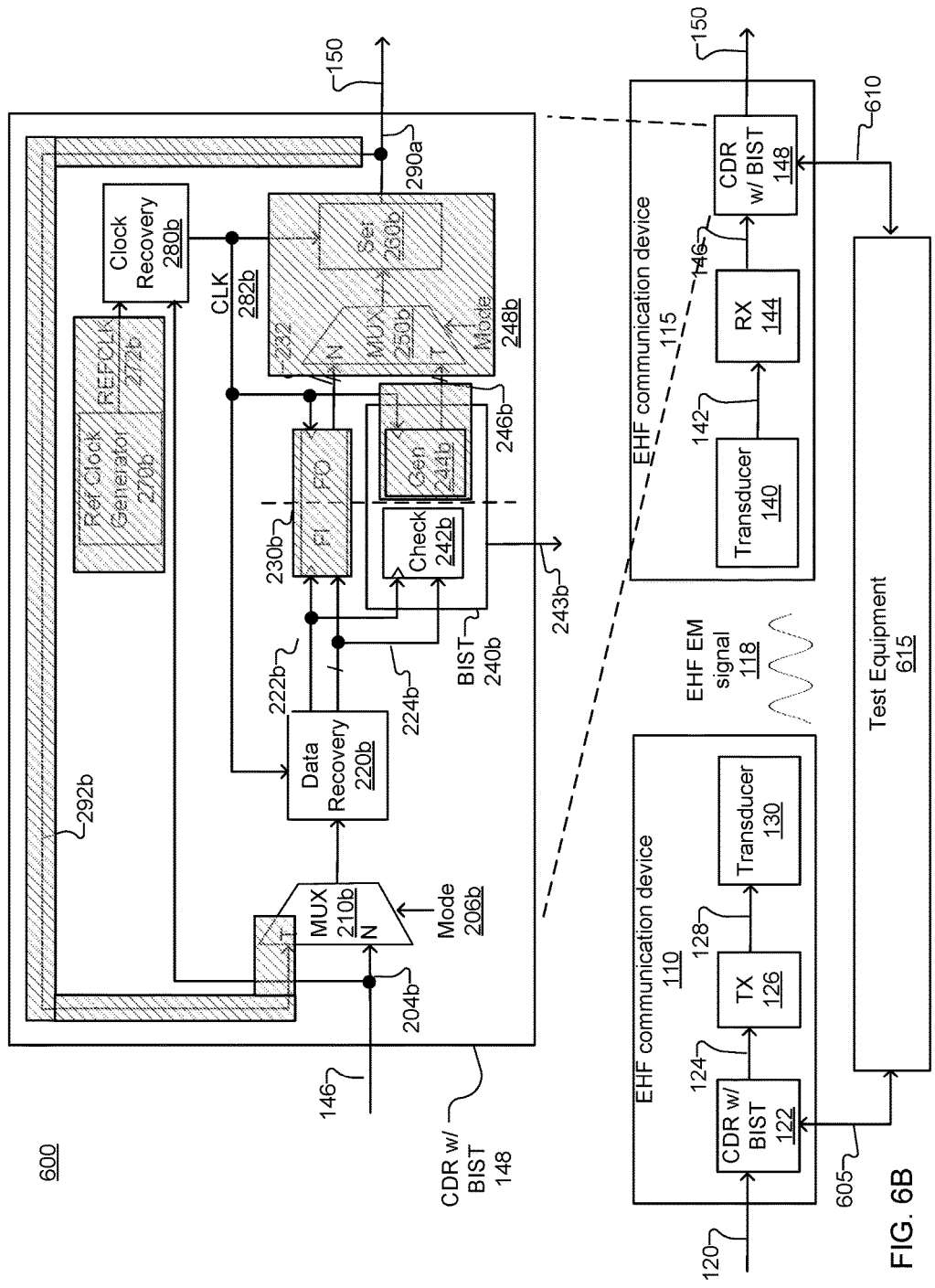

The BIST capabilities of the CDR circuit 200 can also be re-used to perform a system level test of multiple EHF communication devices instead of performing a BIST. FIGS. 6A and 6B illustrate a system 600 in which a system level test can be performed using the BIST capabilities of the CDR circuit, according to another embodiment.

Referring to both FIGS. 6A and 6B, the system 600 includes two EHF communication devices 110 and 115 and test equipment 615. Test equipment 615 communicates with the EHF communication device 110 through a control bus 605. Test equipment 615 communicates with the EHF communication device 115 through a control bus 610. The test equipment 615 can send commands to the EHF communication devices 110 and 115 through the control buses 605 and 610 for controlling the system level test. The test equipment 615 can also receive test result information from the EHF communication devices 110 through the control buses 605 and 610. In one embodiment, the control buses 605 and 610 are serial peripheral interface (SPI) buses.

An expanded view of the CDR circuit 122 from the transmitting EHF communication device 110 is shown in FIG. 6A. An expanded view of the CDR circuit 148 from the receiving EHF communication device 115 is shown in FIG. 6B. The components of the CDR circuits 122 and 148 are the same components which were previously described by reference to FIGS. 2-4. The reference numbers of components in the CDR 122 are labeled with an additional "a" in FIG. 6A, while the reference numbers of components in the CDR 148 are labeled with an additional "b" in FIG. 6B. Portions of the CDR circuits 122 and 148 that are not used during the system level test are shown with diagonal shading in FIGS. 6A and 6B.

Referring now to FIG. 6A, during the system level test, an input data signal 120 is provided to the input signal node 204*a* of the CDR circuit 122. The input data signal 120 can be provided by the test equipment 615 or some other external device. The clock recovery circuit 280*a* of the CDR circuit 122*a* receives the input data signal 120 from node 204*a* and recovers a clock signal 282*a* from the input data signal 120. In other embodiments, the clock recovery circuit 280*a* may generate the clock signal 282*a* from an internally generated reference clock signal 272a or an externally generated reference clock signal.

The test pattern generator 244a is turned on and outputs a test data pattern 246a. The test data pattern 246a is transmitted to the other EHF communication device 115 over an EHF communication channel. In specific, the test data pattern 246a is serialized and provided via the MUX 250a and serializer 260a to the output node 290a as a data signal 124. The transmitter circuit 126a modulates an EHF carrier signal with the data signal 124 to generate an EHF electrical signal 128, and the transducer 130 converts the EHF electrical signal 128 into an EHF electromagnetic signal 118. The resulting EHF electromagnetic signal 118 thus includes the test data pattern 246.

Referring now to FIG. 6B, during the system level test, the test data pattern 246a is received by the other EHF communication device 115 over an EHF communication channel. In specific, the transducer 140 receives the EHF electromagnetic signal 118 and converts it into an EHF electrical signal 142. The receiver RX 144 demodulates the EHF electrical signal 142 to generate a data signal 146. The data signal 146 includes the original test data pattern 246a.

The data signal 146 that includes the original test data pattern 246a is received at the input signal node 204b. The clock recovery circuit 280b generates a recovered clock signal 282b from the data signal 146. The recovered clock signal 282b is phase aligned and locked to the data signal 146.

The MUX 210b selects the data signal 146 (which includes the original test data pattern 246a) and provides the data signal 146 to the input of the data recovery circuit 220b. The data recovery circuit 220b recovers data 224b from the data signal 146 (which includes the original test data pattern 246a).

The test data pattern checker circuit 242b checks the recovered data 224b for errors. For example, as previously explained, the test data pattern checker circuit 242b can be a PRBS checker that deterministically predicts the remaining bit sequence of a pseudo random pattern from the first N bits of the recovered data 224b, and then compares the predicted bits against remaining bits of the recovered data 224b to identify errors.

The BIST control circuit 242b generates the test result signal 243b indicating whether the system level test failed or passed. The state of the test result signal 243b depends on whether any errors are detected in the recovered data 224b. The test result signal 243b indicates a failure if there are errors detected in the recovered data 224b. The system level test passes if there are no errors in the recovered data 224b.

Figure 7:
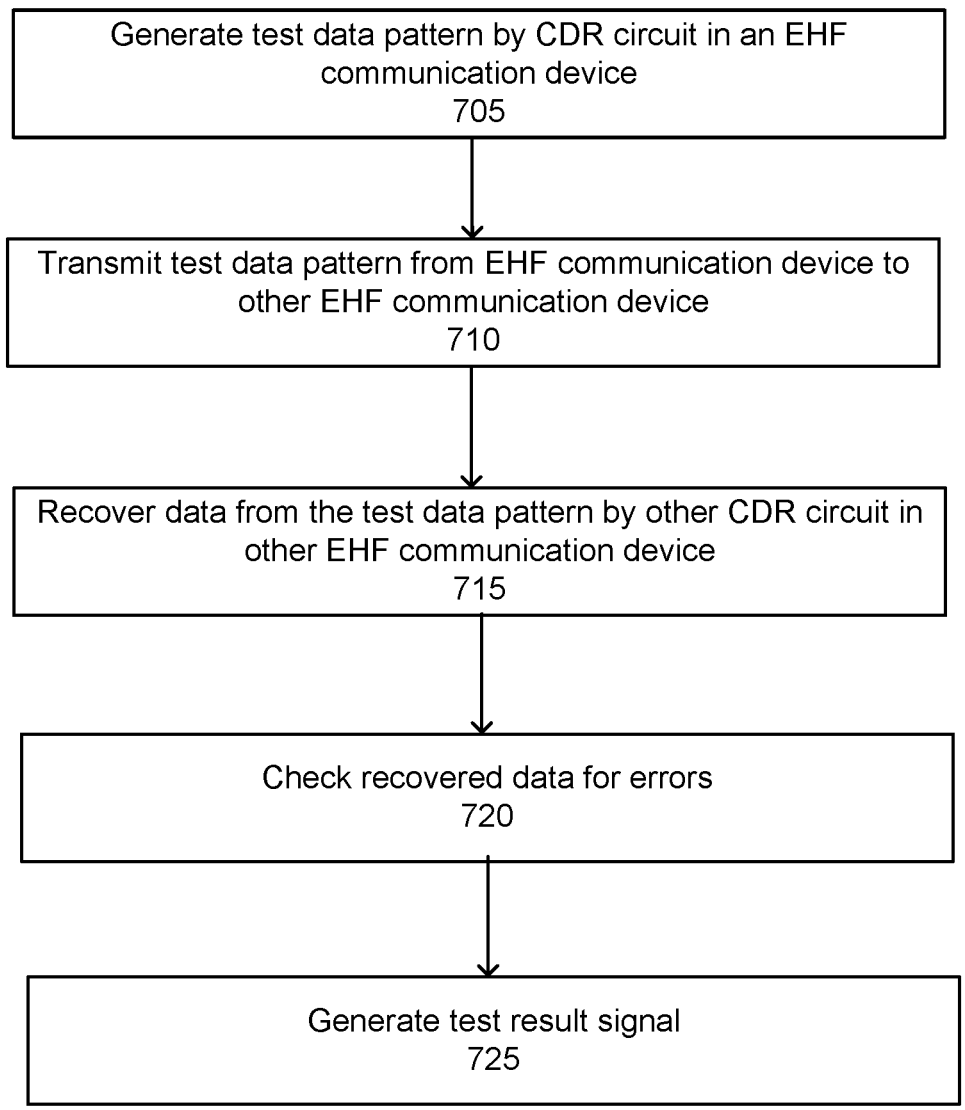
FIG. 7 is a flowchart for a method of operation in the system of FIG. 6A-6B during a system level test, according to an embodiment of the present disclosure.

FIG. 7 is a flowchart for a method of operation in the system 600 of FIG. 6A-6B during a system level test, according to an embodiment of the present disclosure. In step 705, a test data pattern 246a is generated by a CDR circuit 122 of the EHF communication device 110. In step 710, the test data pattern is transmitted from the EHF communication device 110 to the other EHF communication device 115. In step 715, data 224b is recovered from the test data pattern by the other CDR circuit 148 in the other EHF communication device 115. In step 720, the recovered data 224b is checked for errors by the test pattern checking circuit 242b. In step 725, a test result signal 243b indicating whether the system level test has passed or failed is generated based on whether errors are detected. The test result signal 243b can be used by the test equipment 615 to determine if the system level test has passed or failed and to present an indication to a user of whether the test passed or failed.

In another embodiment, the system 600 can also be used to run an additional system level margin test that tests the margin of the system. This additional system level test includes operations that are similar to the system level test described in the previous paragraphs. However, this additional system level test includes additional operations that will now be described. First, referring again to FIG. 6A, the test equipment 615 can send commands via the communication bus 605 that repeatedly vary one or more parameters of the clock recovery circuit 280a during the system level test. This introduces a scalable and known amount of jitter into the clock signal 282a and therefore also introduces jitter into the test data pattern 246a. Some parameters of the clock recovery circuit 280a that can be varied include the loop parameters (two of them scalable R and C values) of a VCO or a charge pump current of the VCO in the clock recovery circuit 280a.

Second, referring again to FIG. 6B, the test equipment 615 now can perform a data eye scanning operation to measure the width of a data eye at the EHF communication device 115. To perform data eye scanning, the test equipment 615 sends commands that cause the CDR circuit 148 to incrementally adjust the phase position of the phase adjusted clock signal 222b. For each phase position, the phase adjusted clock signal 222b is used by the data recovery circuit 220b to sample the data signal (which includes the incoming test data pattern 246a) and recover the data 224b, and the test pattern checker circuit 242b checks the recovered data 224b for errors. For each phase position, the test equipment 615 monitors the state of the test result signal 243b for a test failure. When the test result signal 243b indicates the presence of a failure, it means the phase of the phase adjusted clock signal 222b has reached the edge of the data eye. The width of the data eye provides an indication of the available margin. The test equipment 615 can use the state of the test result signal 243b for each phase position to generate a test report describing the width of the data eye. For example, the test report can include a bathtub curve that includes phase along the X axis and failure rate on the Y axis.

Figure 8:
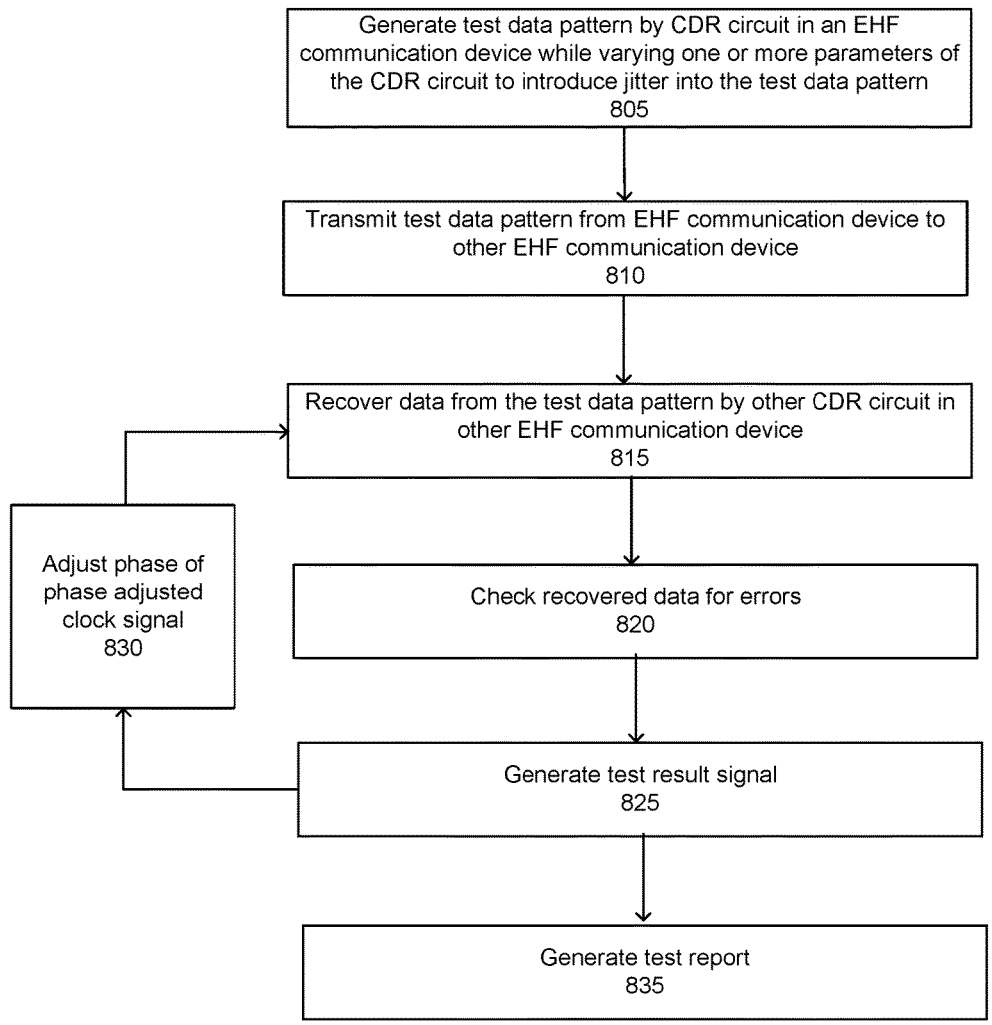
FIG. 8 is a flowchart for a method of operation in the system of FIG. 6A-6B during a system level margin test, according to an embodiment of the present disclosure.

FIG. 8 is a flowchart for a method of operation in the system 600 of FIG. 6A-6B during a system level margin test, according to an embodiment of the present disclosure. In step 805, a test data pattern 246a is generated by a CDR circuit 122 of the EHF communication device 110. While the test data pattern 246a is being generated, jitter is introduced into the test data pattern 246a by adjusting one or more parameters of the clock recovery circuit 280a. In step 810, the test data pattern 246a is transmitted from the EHF communication device 110 to other EHF communication device 115.

In step 815, data 224b is recovered from the test data pattern by the other CDR circuit 148 in the other EHF communication device 115. In step 820, the recovered data 224b is checked for errors by the test pattern checker circuit 242b. In step 825, a test result signal 243b indicating whether the system level test has passed or failed is generated based on whether errors are detected. The test result signal can be monitored and saved by the test equipment 615. In step 830, a phase of the adjusted clock signal 222b within the CDR circuit 148 is adjusted. Step 815, 820, 825 and 830 are repeated until all phases have been checked. In step 835, test equipment 615 generates a test report once from the states of the test result signal 825 once all phases have been checked. Steps 815-835 represent steps of an eye scanning operation.

Upon reading this disclosure, those of skill in the art may appreciate still additional alternative designs for a system having a CDR circuit with a BIST circuit and uses of the BIST circuit. Thus, while particular embodiments and applications of the present disclosure have been illustrated and described, it is to be understood that the disclosure is not limited to the precise construction and components disclosed herein. Various modifications, changes and variations which may be apparent to those skilled in the art may be made in the arrangement, operation and details of the method and apparatus of the present disclosure herein without departing from the spirit and scope of the disclosure as defined in the appended claims.

What is claimed is:

1. A device, comprising:
 a clock data recovery (CDR) circuit having an input node, an output node, a data recovery circuit, and a self-test circuit, the CDR circuit supporting a first mode of operation and a second mode of operation,
 wherein in the first mode, the CDR circuit receives an input data signal at the input node and provides the input data signal to an input of the data recovery circuit, the data recovery circuit recovers first data from the input data signal, and the CDR circuit provides the first data for output at the output node, and
 wherein in the second mode, the self-test circuit generates a test data pattern which is provided to the output node and looped back to the input of the data recovery circuit, the data recovery circuit recovers second data from the test data pattern, and the self-test circuit checks the second data for errors.

2. The device of claim 1, wherein the first mode is a normal mode of operation and the second mode is a built in self-test (BIST) mode of operation.

3. The device of claim 1, wherein the self-test circuit generates a test result signal indicating whether a built in self-test (BIST) has passed or failed based on whether errors are detected in the second data.

4. The device of claim 1, wherein the self-test circuit comprises:
 a test pattern generator circuit operative to generate the test data pattern; and
 a test pattern checker circuit operative to check the second data for errors.

5. The device of claim 4, wherein the test pattern generator circuit operates according to a first clock signal and the test pattern checker circuit operates according to a second clock signal different than the first clock signal.

6. The device of claim 5, wherein the CDR circuit comprises:
 a first in first out (FIFO) buffer circuit having an input side that operates according to the second clock signal and an output side that operates according to the first clock signal.

7. The device of claim 6, further comprising:
 a multiplexer having a first multiplexer input coupled to an output of the FIFO, a second multiplexer input coupled to an output of the test pattern generator circuit, and a multiplexer output, the multiplexer selecting the first multiplexer input in the first mode and selecting the second multiplexer input in the second mode.

8. The device of claim 1, wherein the test data pattern is a pseudo-random data pattern.

9. The device of claim 1, wherein the self-test circuit include a pseudo-random binary sequence (PRBS) checker circuit that checks the second data for errors.

10. The device of claim 1, wherein the CDR circuit comprises a clock recovery circuit,
 wherein in the first mode, the clock recovery circuit recovers a clock signal from the input data signal; and
 wherein in the second mode, the clock recovery circuit recovers the clock signal from a reference clock signal instead of the input data signal.

11. The device of claim 10, wherein the clock recovery circuit comprises a phase locked loop circuit,
 wherein in the first mode, the phase locked loop circuit performs a phase comparison of the clock signal to the input data signal, and recovers the clock signal based on the phase comparison of the clock signal to the input data signal; and
 wherein in the second mode, the phase locked loop circuit divides a frequency of the clock signal to generate a frequency divided clock signal, performs a phase comparison of the reference clock signal to the frequency divided clock signal, and recovers the clock signal based on the phase comparison of the reference clock signal to the frequency divided clock signal.

12. The device of claim 1, further comprising:
 a multiplexer having a first multiplexer input coupled to the input node, a second multiplexer input coupled to the output node via the loopback signal path, and a multiplexer output coupled to an input of the data recovery circuit, the multiplexer selecting the first multiplexer input in the first mode and selecting the second multiplexer input in the second mode.

13. The device of claim 1, further comprising:
 a transducer to convert between an extremely high frequency (EHF) electrical signal and an EHF electromagnetic signal; and
 at least one of:
  a transmitter circuit to modulate a carrier signal with the recovered first data from the CDR circuit to generate the EHF electrical signal; or
  a receiver circuit to demodulate the EHF electrical signal into the input data signal for the CDR circuit.

14. A method of operation in a device that comprises a clock data recovery (CDR) circuit having an input node, an output node and a data recovery circuit, the CDR circuit supporting a first mode and a second mode of operation, the method comprising:
 in the first mode:
  receiving an input data signal at the input node;
  providing the input data signal at the input node to an input of the data recovery circuit, the data recovery circuit recovering first data from the input data signal; and
  providing the first data to the output node; and
 in the second mode:
  generating a test data pattern which is provided to the output node;
  looping back the test data pattern from the output node to the input of the data recovery circuit, the data recovery circuit recovering second data from the test data pattern, and
  checking the second data for errors.

15. A method of performing a system level test in a system that comprises a first clock and data recovery (CDR) circuit of a first communication device and a second CDR circuit of a second communication device, the method comprising:
 generating a test data pattern by the first CDR circuit;
 transmitting the test data pattern from the first communication device to the second communication device;

recovering, by a data recovery circuit of the second CDR circuit, data from the test data pattern;

checking, by a test circuit of the second CDR circuit, the recovered data for errors; and generating a test result signal indicating whether the system level test has passed or failed based on whether errors are detected in the recovered data.

16. The method of claim 15, further comprising:

varying one or more parameters of the first CDR circuit to introduce jitter into the test data pattern;

performing a data eye scanning operation by:

adjusting a phase of a clock signal within the second CDR circuit that is used to recover the data from the test pattern; and monitoring the test result signal for one or more phases of the clock signal.

17. The method of claim 16, wherein the one or more parameters are varied under control of test equipment that is external to the first communication device and the second communication device, and the phase of the clock signal is adjusted under control of the test equipment.

18. The method of claim 15, wherein the test data pattern is a pseudorandom data pattern and the test circuit is a pseudorandom binary sequence (PRBS) checker circuit.

19. The method of claim 18, wherein the second CDR circuit includes a first in first out (FIFO) buffer circuit having an input side that operates according to a second clock signal and an output side that operates according to a first clock signal, wherein the PRBS checker circuit operates according to the second clock signal.

20. The method of claim 15, wherein the first communication device is a first EHF communication device, the second communication device is a second EHF communication device, and transmitting the test data pattern from the first communication device to the second communication device comprises:

transmitting the test data pattern from the first EHF communication device to the second EHF communication device via an EHF electromagnetic communication channel.

* * * * *